US007970112B1

(12) United States Patent
Triggs

(10) Patent No.: US 7,970,112 B1
(45) Date of Patent: Jun. 28, 2011

(54) TELEPHONIC VOTING SYSTEM

(76) Inventor: Darrell D. Triggs, Trinity, FL (US)

( * ) Notice: Subject to any disclaimer, the term of this patent is extended or adjusted under 35 U.S.C. 154(b) by 0 days.

(21) Appl. No.: 12/661,218

(22) Filed: Mar. 12, 2010

(51) Int. Cl.
 *H04M 11/00* (2006.01)

(52) U.S. Cl. .................... 379/92.02; 455/410; 379/93.03
(58) Field of Classification Search ............... 379/93.02, 379/92.02
 See application file for complete search history.

(56) References Cited

U.S. PATENT DOCUMENTS

| 7,237,717 | B1 | 7/2007 | Rao |
| 7,336,774 | B2 * | 2/2008 | Creamer et al. ........... 379/92.02 |
| 7,431,209 | B2 | 10/2008 | Chung |
| 2003/0142800 | A1 * | 7/2003 | Paschal et al. ............. 379/92.02 |
| 2009/0079538 | A1 * | 3/2009 | Fein et al. .................... 455/410 |

* cited by examiner

*Primary Examiner* — Curtis Kuntz
*Assistant Examiner* — Maria El-Zoobi

(57) ABSTRACT

A computer system has a CPU, a registration terminal and a plurality of telephones. The CPU has an office registration section, an initial phone-in registration section and a vote section. A registration office contains the registration terminal whereat a voter provides appropriate identification and proof of citizenship, if necessary, and then enters a personal identification number into the office registration section through the registration terminal. A first link is between one of the plurality of telephones and the initial phone-in registration section, preferably through a computer, whereby the voter enters into the initial phone-in registration section the personal identification number, an identifying name and a password. A second link is between one of the plurality of telephones and the vote section, preferably through a computer, whereby the voter enters into the vote section the personal identification number and provides the identification name and the password and then votes.

2 Claims, 2 Drawing Sheets

US 7,970,112 B1

TELEPHONIC VOTING SYSTEM

BACKGROUND OF THE INVENTION

1. Field of the Invention

The present invention relates to a telephonic voting system and more particularly pertains to allowing properly registered citizens to vote in an election of officials and on issues, the election being done in a reliable, secure, convenient and economical manner.

2. Description of the Prior Art

The use of voting systems of known designs and configurations is known in the prior art. More specifically, voting systems of known designs and configurations previously devised and utilized for the purpose of allowing citizens to vote in an election of officials and on issues are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 7,237,717 issued Jul. 3, 2007 to Rao relates to a Secure System for Electronic Voting. U.S. Pat. No. 7,336,774 issued Feb. 26, 2008 to Creamer relates to Vote Processing in a Public Switching Telephone Network. Lastly, U.S. Pat. No. 7,431,209 issued Oct. 7, 2008 to Chung relates to Electronic Voting Apparatus, System and Method.

While these devices fulfill their respective, particular objectives and requirements, the aforementioned patents do not describe telephonic voting system that allows allowing properly registered citizens to vote in an election of officials and on issues, the election being done in a reliable, secure, convenient and economical manner.

In this respect, the telephonic voting system according to the present invention substantially departs from the conventional concepts and designs of the prior art, and in doing so provides an apparatus primarily developed for the purpose of allowing properly registered citizens to vote in an election of officials and on issues, the election being done in a reliable, secure, convenient and economical manner.

Therefore, it can be appreciated that there exists a continuing need for a new and improved telephonic voting system which can be used for allowing properly registered citizens to vote in an election of officials and on issues, the election being done in a reliable, secure, convenient and economical manner. In this regard, the present invention substantially fulfills this need.

SUMMARY OF THE INVENTION

In view of the foregoing disadvantages inherent in the known types of voting systems of known designs and configurations now present in the prior art, the present invention provides an improved telephonic voting system. As such, the general purpose of the present invention, which will be described subsequently in greater detail, is to provide a new and improved telephonic voting system and method which has all the advantages of the prior art and none of the disadvantages.

To attain this, the present invention essentially comprises a telephonic voting system having a computer system. The computer system includes a central processing unit and a registration terminal and a plurality of telephones. The central processing unit has an office registration section, an initial phone-in registration section, and a vote section.

Next provided is a registration office containing a registration terminal. At the registration terminal a voter provides appropriate identification and proof of citizenship, if necessary. Thereafter, the voter enters a personal identification number (PIN) into the office registration section of the central processing unit through the registration terminal.

Next provided is a first link between one of the plurality of telephones and the initial phone-in registration section of the central processing unit, preferably through a computer. When requested, the voter enters into the initial phone-in section of the central processing unit through the first link the personal identification number an identifying name and password and an answer to one or more security questions.

Next a second link is provided. The second link is between one of the plurality of telephones and the vote section of the central processing unit, preferably through a computer. When requested, the voter enters into the vote section the personal identification number and provides the identifying name and the password and answers the security question and votes.

The activities at the registration office are during a first period with no link between the central processing unit and any of the plurality of telephones. The activities at the initial phone-in registration are during a second period subsequent to the first period where there is no link between the vote section and any of the plurality of telephones. The vote is during a third period subsequent to the second period where there is no link between the initial phone-in section and any of the plurality of telephones. The activities at the initial phone-in registration and the activities during the vote are followed by the voter editing any vote if desired.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved telephonic voting system which has all of the advantages of the prior art voting systems of known designs and configurations and none of the disadvantages.

It is another object of the present invention to provide a new and improved telephonic voting system which may be easily and efficiently manufactured and marketed.

It is further object of the present invention to provide a new and improved telephonic voting system which is of durable and reliable constructions.

An even further object of the present invention is to provide a new and improved telephonic voting system which is susceptible of a low cost of manufacture with regard to both materials and labor, and which accordingly is then susceptible of low prices of sale to the consuming public, thereby making such telephonic voting system economically available.

Even still another object of the present invention is to provide a telephonic voting system for allowing properly registered citizens to vote in an election of officials and on issues, the election being done in a reliable, secure, convenient and economical manner.

Lastly, it is an object of the present invention to provide a new and improved telephonic voting system with a computer system having a CPU, a registration terminal and a plurality of telephones. The CPU has an office registration section, an initial phone-in registration section and a vote section. A registration office contains the registration terminal whereat a voter provides appropriate identification and proof of citizenship, if necessary, and then enters a personal identification number into the office registration section through the registration terminal. A first link is between one of the plurality of telephones and the initial phone-in registration section, preferably through a computer, whereby the voter enters into the initial phone-in registration section the personal identification number, an identifying name and a password. A second link is between one of the plurality of telephones and the vote section, preferably through a computer, whereby the voter enters into the vote section the personal identification number and provides the identification name and the password and then votes.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
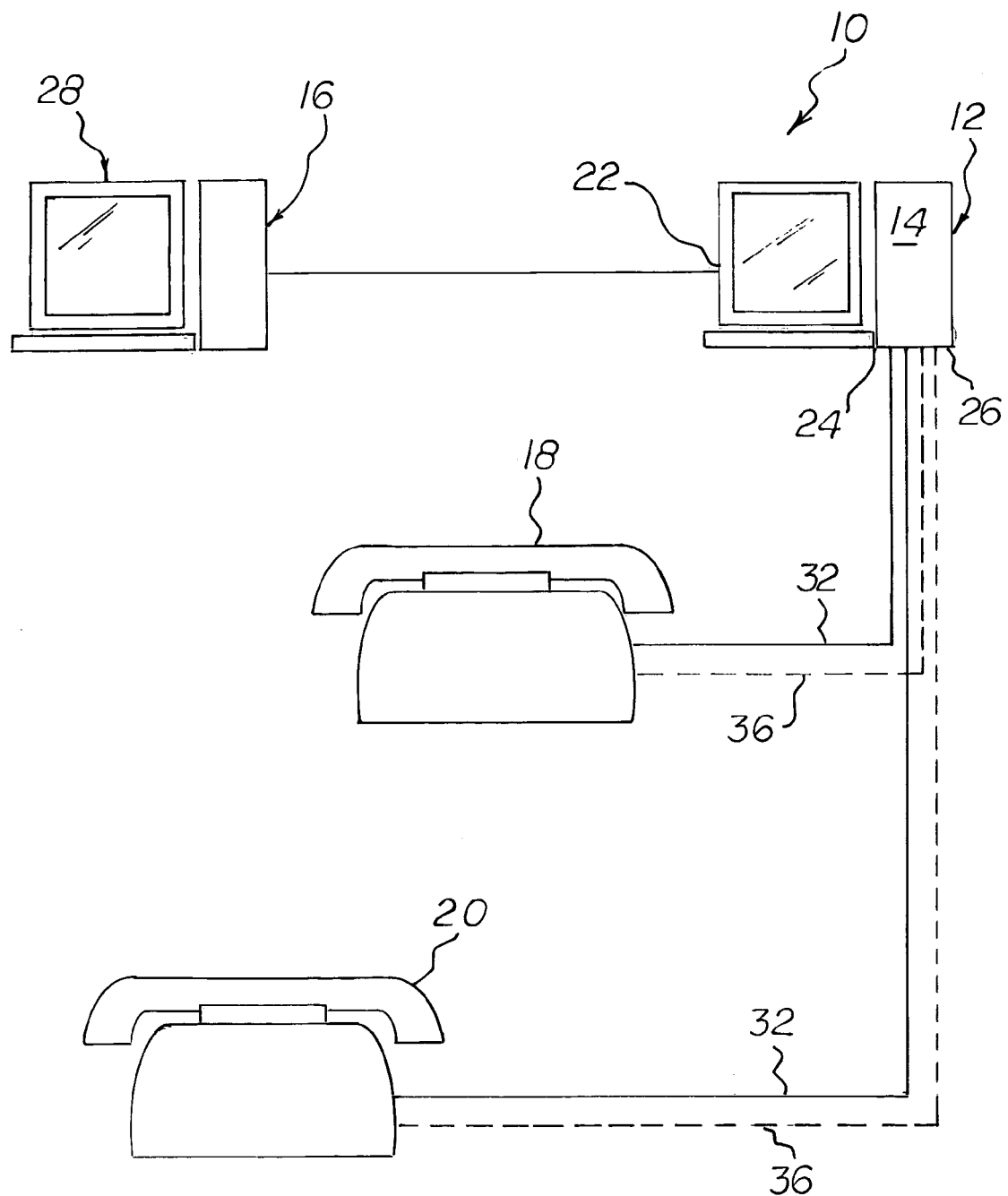
FIG. 1 is a schematic illustration of a telephonic voting system constructed in accordance with the principles of the present invention.
Figure 2:
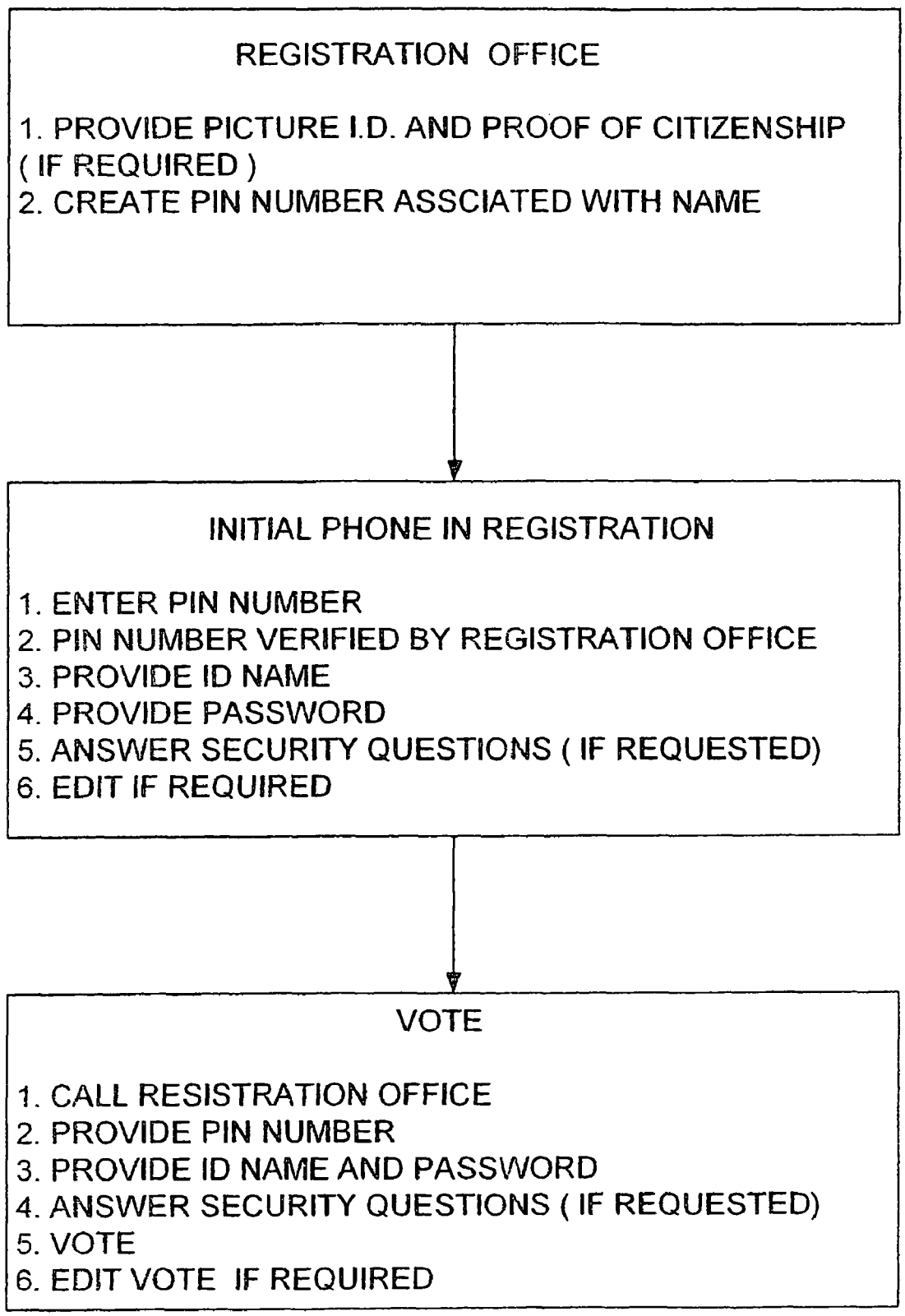
FIG. 2 is a flow diagram of a telephonic voting method with steps configured in accordance with the principles of the present invention.

With reference now to the drawings, and in particular to FIG. 1 thereof, the preferred embodiment of the new and improved telephonic voting system embodying the principles and concepts of the present invention and generally designated by the reference numeral 10 will be described.

The present invention, the telephonic voting system 10 is comprised of a plurality of components. Such components in their broadest context include a computer system, a registration office, a first link, and a second link. Such components are individually configured and correlated with respect to each other so as to attain the desired objective.

First provided in the telephonic voting system 10 is a computer system 12. The computer system includes a central processing unit 14 and a registration terminal 16 and a plurality of telephones 18, 20. The central processing unit has an office registration section 22, an initial phone-in registration section 24, and a vote section 26.

Next provided is a registration office 28 containing a registration terminal. At the registration terminal a voter provides appropriate identification and proof of citizenship, if necessary. Thereafter, the voter enters a personal identification number into the office registration section of the central processing unit through the registration terminal.

Next provided is a first link 32 between one of the plurality of telephones and the initial phone-in registration section of the central processing unit. When requested, the voter enters into the initial phone-in section of the central processing unit through the first link the personal identification number an identifying name and password and an answer to one or more security questions.

Next a second link 36 is provided. The second link is between one of the plurality of telephones and the vote section of the central processing unit. When requested, the voter enters into the vote section the personal identification number and provides the identifying name and the password and answers the security question and votes.

The activities at the registration office are during a first period with no link between the central processing unit and any of the plurality of telephones. The activities at the initial phone-in registration are during a second period subsequent to the first period where there is no link between the vote section and any of the plurality of telephones. The vote is during a third period subsequent to the second period where there is no link between the initial phone-in section and any of the plurality of telephones. The activities at the initial phone-in registration and the activities during the vote are followed by the voter editing any vote if desired.

The present invention includes a telephonic voting method for allowing properly registered citizens to vote in an election of officials and on issues. The election is done in a reliable, secure, convenient and economical manner. The method comprises a plurality of steps.

The first step is providing a computer system 12. The computer system has an office registration section 22 and an initial phone-in registration section 24 and a vote section 26.

At the registration office during a first period a plurality of steps are included. The steps are a) providing appropriate identification and proof of citizenship, if necessary, by a voter and b) secretly entering into the initial phone-in registration section, a personal identification number associated with the voter.

At an initial phone-in registration during a second period subsequent to the first period, information is exchanged between the voter and the initial phone-in registration section. The steps are a) entering of the personal identification number by the voter when requested, b) verifying the entered personal identification number, c) the voter providing an identifying name to the office registration section when requested, d) the voter providing a password to the office registration section when requested, e) the voter answering one or more security questions, such as "What is your mother's maiden name, the name of your first pet, etc.", when requested, f) the phone-in registration section providing a replay to the voter the answers provided during the second period; g) the voter listening to the replay and editing any answer if desired.

At a phone-in vote during a third period subsequent to the second period, information is exchanged between the voter and the vote section. The steps are a) the voter phoning into the voter registration office from a phone, b) the voter providing the personal identification number when requested, c) the voter providing the identification name and the password when requested, d) the voter answering the security question when requested, e) the voter voting when requested, f) the phone-in registration section providing a replay to the voter of the vote provided during the third period; g) the voter listening to the vote and editing the vote if desired.

For voters in the military, the registration office will be any appropriate office established by the military. For non-military voters out of the United States, the registration office will be the U.S. Embassy in the foreign country or other registration office established by the U.S. Embassy.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telephonic voting system (10) comprising:
   a computer system (12) including a central processing unit (14) and a registration terminal (16) and a plurality of telephones (18) (20), the central processing unit having an office registration section (22) and an initial phone-in registration section (24) and a vote section (26);
   a registration office (28) containing a registration terminal whereat a voter provides appropriate identification and proof of citizenship, if necessary, and, thereafter, the voter enters a personal identification number into the office registration section of the central processing unit through the registration terminal;
   a first link (32) between any one of the plurality of telephones and the initial phone-in registration section of the central processing unit, preferably through a computer, whereby, when requested, the voter enters into the initial phone-in section of the central processing unit through the first link the previously entered personal identification number and an identifying name and password and an answer to one or more security questions; and
   a second link (36) between any one of the plurality of telephones and the vote section of the central processing unit, preferably through a computer, whereby, when requested, the voter enters into the vote section the previously entered personal identification number and provides the identifying name and the password and answers the security question and votes;
   wherein the activities at the registration office are during a first period with no link between the central processing unit and any of the plurality of telephones;
   wherein the activities at the initial phone-in registration are during a second period subsequent to the first period where there is no link between the vote section and any of the plurality of telephones;
   wherein the vote is during a third period subsequent to the second period where there is no link between the initial phone-in section and any of the plurality of telephones; and
   the activities at the initial phone-in registration and the activities during the vote are followed by replaying and listening to and editing any vote if desired.

2. A telephonic voting method for allowing properly registered citizens to vote in an election of officials and on issues, the method including the steps of:
   providing a computer system (12) having an office registration section (22) and an initial phone-in registration section (24) and a vote section (26);
   at the registration office during a first period including the steps of: a) providing appropriate identification and proof of citizenship, if necessary, by a voter and b) secretly entering into the initial phone-in registration section, a personal identification number associated with the voter;
   at an initial phone-in registration from any phone during a second period subsequent to the first period, exchanging information between the voter and the initial phone-in registration section including the steps of: a) entering of the previously entered personal identification number by the voter when requested, b) verifying the entered personal identification number, c) the voter providing an identifying name to the office registration section when requested, d) the voter providing a password to the office registration section when requested, e) the voter answering one or more security questions when requested, f) the phone-in registration section providing a replay to the voter the answers provided during the second period; g) the voter listening to the replay and editing any answer if desired; and
   at a phone-in vote from any phone during a third period subsequent to the second period, exchanging information between the voter and the vote section including the steps of: a) the voter phoning into the voter registration office from any phone, b) the voter providing the previously entered personal identification number when requested, c) the voter providing the identification name and the password when requested, d) the voter answering the security question when requested, e) the voter voting when requested, f) the phone-in registration section providing a replay to the voter of the vote provided during the third period; g) the voter replaying the vote and listening to the vote and editing the vote if desired.

* * * * *